United States Patent [19]

Hess

[11] Patent Number: 4,700,964
[45] Date of Patent: Oct. 20, 1987

[54] BICYCLE PIVOT ASSEMBLY

[75] Inventor: Stanley C. Hess, Somis, Calif.

[73] Assignee: American Recreation Group, Commack, N.Y.

[21] Appl. No.: 888,470

[22] Filed: Jul. 21, 1986

[51] Int. Cl.⁴ .............................................. B62H 1/12
[52] U.S. Cl. ............................ 280/289 R; 280/289 H; 280/293; 280/294; 280/295; 74/594.4; 74/551.8
[58] Field of Search .......... 280/289 R, 289 H, 289 G, 280/293, 294, 295; 272/73; 74/594.1, 594.4, 551.8, 551.1, 551.9

[56] References Cited

U.S. PATENT DOCUMENTS 3,918,323  11/1975  Prager .................................. 74/551.8

FOREIGN PATENT DOCUMENTS 50556   8/1935  Denmark ......................... 280/289 R
388146  1/1924  Fed. Rep. of Germany ... 280/289 R
959236  3/1950  France ............................ 280/289 R
8659    of 1898 United Kingdom ........... 280/289 R Primary Examiner—John A. Pekar
Attorney, Agent, or Firm—Gottlieb, Rackman & Reisman

[57] ABSTRACT

A bicycle suitable for use when performing free-style tricks in which the bicycle is turned almost completely sideways is provided. The handles and the pedals of the bicycle include a rotatable ball bearing which reduces abrasion and increases smoothness when one of the handles and/or pedals contacts the ground.

14 Claims, 4 Drawing Figures

BICYCLE PIVOT ASSEMBLY

BACKGROUND OF THE INVENTION

This invention relates to a bicycle component suitable for facilitating freestyle tricks, and more particularly, to a bicycle component which includes a rotatable ball bearing adapted to be positioned at the ends of the bicycle handle or on the bicycle pedals for reducing abrasion when one of the handles and/or pedals contacts the floor during performance of a freestyle bicycle trick.

Although riding a bicycle remains a popular recreational sport for many people, bicycles are being increasingly used in the sport known as freestyling. This involves performing various tricks and stunts with a bicycle, including those known as wheelies, drop-ins, the surfer, and the infinity roll.

When performing many of these tricks, the bicycle is often oriented almost completely horizontal, i.e., with its wheel axies almost vertical, and with the body of the rider extending upward and out. As a result, the handles and the pedals of the bicycle are often scraping along the ground while the bike is in motion. This is not desirable since the friction produced reduces the speed of the bicycle, produces turning torques that are difficult to control, and may even cause the bicycle to come to an abrupt stop, thereby increasing the risk of injury to the bicycle freestyler. The motion of the bicycle can become radically dependent upon the coefficient of sliding friction of the road surface, something that could change abruptly.

Accordingly, it is desirable to provide a bicycle and a bicycle accessory which overcome these disadvantages and which enable a bicycle freestyler to perform tricks with the bicycle when placed in a substantially horizontal position without causing substantial friction at the handles or the pedals.

SUMMARY OF THE INVENTION

Generally speaking, in accordance with the invention, a bicycle that is suitable for freestyle tricks which place the bicycle in a substantially horizontal position with respect to the ground is provided. The bicycle of the invention includes a forward section, a central section, and a rearward section. Handlebars are connected to the forward section in a conventional manner and pedals are connected to the central section in a conventional manner. The ends of the handlebars and the pedals are provided with a rotation means such as a ball bearing. When the bicycle is positioned horizontally during the performance of a freestyle trick, the ball bearings extending from the handles and the pedals will come in contact with the ground. Since the ball bearings are fully rotatable, abrasion is significantly reduced and smoothness of the freestyle trick is enhanced.

Accordingly, it is an object of the invention to provide a bicycle suitable for use in performing freestyle tricks.

Another object of the invention is to provide a means for reducing friction on the handlebars or on the pedals when the bicycle is positioned sideways during performance of a trick.

Another object of the invention is to provide a ball bearing at the ends of the handles and the pedals adaptable to rotate when in contact with the ground.

Other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF A PREFERRED EMBODIMENT

Figure 1:
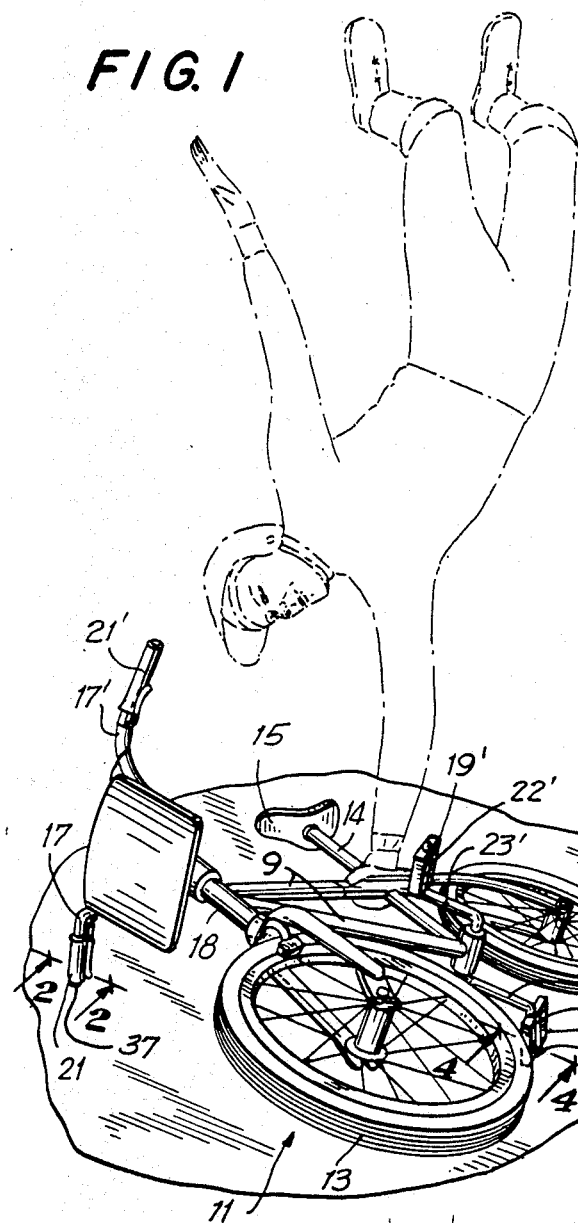
FIG. 1 is a perspective view of a bicycle in accordance with the invention being used by a rider to perform a freestyle trick.

Referring first to FIG. 1, a freestyle bicycle 11 in accordance with the invention is shown in operation. Bicycle 11 includes a frame 9, a first wheel 13 connected at the front end of frame 9, and a second wheel 13' connected at the back end of frame 9. Frame 9 further includes a centrally positioned vertical bar 14 which has a seat 15 disposed at the upper end of the bar.

Bicycle 11 also includes a handlebar 18 connected to frame 9 at its front end. Handlebar 18 has two handles 17 extending therefrom and opposite to each other. Handles 17 and 17' include handle grips 21 and 21' which are suitably constructed for gripping by the hands of the bicycle user during conventional operation of bicycle 11.

In order to operate the bicycle, bicycle 11 includes pedals 19 and 19' disposed on either side of frame 9 and below seat 15. Pedals 19 and 19' are connected to frame 9 by pedal arms 23 and 23' respectively. Pedals 19 and 19' pivotably rotate about longitudinal bolts 22 and 21'.

Figure 2:
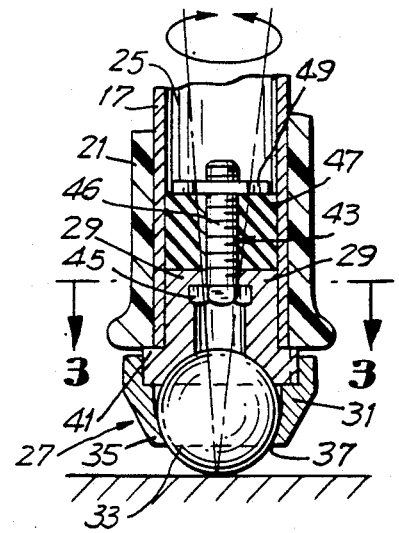
FIG. 2 is a cross-sectional view taken along line 2—2 of FIG. 1 which shows the rotational element connected to the handle of the bicycle.
Figure 3:
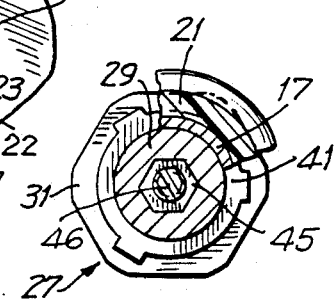
FIG. 3 is a cross-sectional view taken along line 3—3 of FIG. 2.

Turning now to FIG. 2 and also FIG. 3, the end portion of handle 17, which includes annular handle grip 21, is shown formed with a tubular opening 25. Opening 25 receives a pivot assembly 27 which enables the end of handle 17 to roll smoothly when it contacts the ground during the performance of a bicycle trick.

Pivot assembly 27 comprises an upper housing 29, a lower housing 31, which is integrally formed and matingly engaged with upper housing 29, and a ball bearing 33 rotatingly disposed therebetween. Lower housing 31 includes a lower lip 35 which forms a lip opening 37. Lip 35 has a diameter less than the diameter of ball bearing 33 in order that a portion of ball bearing 33 extends below lip 35 but so that ball bearing 33 cannot fall through lip opening 37.

Upper housing 29 is force-fitted into tubular opening 25 and includes a lower annular ridge 41 which engages the end of handle 17. Upper housing 29 also includes a centrally positioned tubular hole 39 for receiving a screw member 43. Screw member 43 includes a head 45 and a threaded shank 46 which extends through upper housing 29 and into and through a flexible annular member 47, which is preferably made of a rubber-like material. The tip of shank 46 has a nut 49 threaded thereabout which is suitable for compressing flexible member 47 when tightened in order that pivot assembly 27 is snugly maintained in tubular opening 25 of handle 17.

In order to connect the assembly to the handle of a bicycle, an opening is first drilled in the end of the handle. Then, the entire assembly, including screw member 43 and flexible member 47, is inserted into the opening, in the manner set forth in FIG. 2. If the assembly is not found to be securely mounted in the opening, the assembly is removed. After removal, nut 49 is tightened along threaded member 43 in order that flexible member 47 is compressed outwardly. The whole assembly is then reinserted into the opening and, if tightening has been sufficient, flexible member 29 will grab the inner wall of the opening in order to securely maintain the assembly in handle 17.

Figure 4:
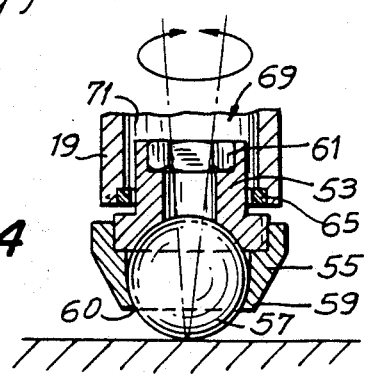
FIG. 4 is a cross-sectional view taken along line 4—4 of FIG. 1 showing the rotational element connected to the pedal of the bicycle.

Turning now to FIG. 4, a pivot assembly 51 in accordance with the invention is shown connected to pedal 19 of bicycle 11. Like the pivot assembly for the handle, pivot assembly 51 includes an upper housing 53, a lower housing 55 intregrally formed and matingly engaged with upper housing 53 and ball bearing 57 rotatingly disposed therebetween. Lower housing 55 includes a lower lip 59 which forms a lip opening 60. Lip 59 has a diameter less than the diameter of ball bearing 57 in order that a portion of ball bearing 57 extends below lip 59 but so that ball bearing 57 cannot fall through lip opening 60.

Upper housing 53 includes an upper annular lip 63. Lip 63 houses hexagonal nut 61 which is integrally formed with the assembly. In order to securely connect the assembly to the pedal, a suitable longitudinal bolt of the pedal (not shown) is inserted through hexagonal nut 61. Pivot assembly 51 is then tightened about the bolt.

Optionally, an annular dirt shield 65 made of a fiber or plastic material is disposed along the lower portion of inner wall 71 in order to prevent the introduction of dirt into opening 69 during operation of the bicycle.

In accordance with the invention, another rotation means other than a ball bearing assembly may be connected to one or both handles of a bicycle and/or to one or both pedals of a bicycle in order that the handles and/or pedals do not scrape the ground when a freestyler performs a bicycle trick.

Although the embodiment shown in the Figures includes a ball bearing assembly connected to only the handle and pedal of one side of the bicycle, the assembly can be connected to one or both pedals and/or one or both handles.

It will thus be seen that the objects set forth above, among those made apparent from the preceding description are efficiently attained and, since changes may be made in the construction of the apparatus set forth, without departing from the spirit and scope of the invention, it is intended that all matter contained herein shall be interpreted as illustrative and not in a limiting sense.

It is also understood that the following claims are intended to cover all the generic and specific features of the invention found herein and all statements of the scope of the invention which, as a matter of language, may be said to fall therebetween or be equivalent thereto.

I claim:

1. A bicycle suitable for freestyle tricks, said bicycle comprising a bicycle frame, said frame including a forward section, a central section, and a rearward section, a first wheel connected to said forward section, a second wheel connected to said rearward section, a seat means connected to said central section, first and second handles connected to said forward section, each of said handles including a handle grip portion, a first and second pedal connected to said central section, wherein at least one of said first pedal, said second pedal, said first handle grip portion and said second handle grip portion includes rotation means for reducing abrasion when said at least one of said handle grips and said pedals contacts the ground when performing said tricks.

2. The bicycle of claim 1, wherein said rotation means is a ball bearing assembly.

3. The bicycle of claim 2, wherein only said handle grip portions include said ball bearing assembly.

4. The bicycle of claim 3, wherein said handle grip portions are formed with an opening, said opening receiving said ball bearing assembly.

5. The bicycle of claim 2, wherein only said pedals include said ball bearing assembly.

6. The bicycle of claim 5, wherein said pedals are formed with an opening, said opening receiving said ball bearing assembly.

7. The bicycle of claim 2, wherein said ball bearing assembly includes an upper housing, a lower housing integrally formed and matingly engaged with said upper housing and a ball bearing rotatingly disposed there- between.

8. The bicycle of claim 5, wherein said lower housing includes a lower lip, said lip forming a lip opening, and wherein said lip has a diameter less than the diameter of said ball bearing, said ball bearing extending below said lip opening.

9. The bicycle of claim 2, wherein said assembly further includes a screw means for fastening and tightening said assembly to said at least one of said pedals and grip portions.

10. A bicycle accessory for a bicycle suitable for freestyle tricks, the bicycle including a bicycle frame, said frame including a forward section, a central section, and a rearward section, a first wheel connected to said forward section, a second wheel connected to said rearward section, a seat means connected to said central section, a first and second handles connected to said forward section, each of said handles including a handle grip portion, a first and second pedal connected to said central section, wherein at least one of said first pedal, said second pedal, said first handle grip portion and said second handle grip portion includes said bicycle accessory, said bicycle accessory comprising rotation means for reducing abrasion when said at least one of said handle grips and said pedals contacts the ground when performing said tricks.

11. The bicycle accessory of claim 10, wherein said rotation means is a ball bearing assembly.

12. The bicycle accessory of claim 11, wherein said ball bearing assembly includes an upper housing, a lower housing integrally formed and matingly engaged with said upper housing and a ball bearing rotatingly disposed therebetween.

13. The bicycle accessory of claim 12, wherein said lower housing includes a lower lip, said lip forming a lip opening, and wherein said lip has a diameter less than the diameter of said ball bearing, said ball bearing extending below said lip opening.

14. The bicycle accessory of claim 11, wherein said assembly further includes a screw means for fastening and tightening said assembly to said at least one of said pedals and grip portions.

* * * * *